United States Patent [19]
Rovira et al.

[11] Patent Number: 5,257,403
[45] Date of Patent: Oct. 26, 1993

[54] METHOD OF SUBCARRIER MULTIPLICATION WHICH PRESERVES AM INFORMATION IN FM SYSTEMS

[75] Inventors: Luis A. Rovira, Atlanta; David P. Womble, Doraville; Allen Walter, Lilburn, all of Ga.; Robert Dennison, Cherry Hinton, England

[73] Assignee: Scientific-Atlanta, Inc., Norcross, Ga.

[21] Appl. No.: 800,721

[22] Filed: Dec. 3, 1991

Related U.S. Application Data

[63] Continuation of Ser. No. 382,773, Jul. 20, 1989.

[51] Int. Cl.5 .............................. H04B 7/00
[52] U.S. Cl. .................... 455/45; 455/102; 455/218; 358/160
[58] Field of Search ............ 455/42, 45, 102, 118, 455/210, 227, 308; 358/160, 186

[56] References Cited

U.S. PATENT DOCUMENTS

| | | | |
|---|---|---|---|
| 2,439,661 | 4/1948 | Keever | 455/102 |
| 2,735,001 | 2/1956 | Wittels | 455/210 |
| 3,778,718 | 12/1973 | Bass et al. | 455/102 |
| 4,079,204 | 3/1978 | Takahashi et al. | 455/102 |

FOREIGN PATENT DOCUMENTS

| | | | |
|---|---|---|---|
| 0112410 | 7/1984 | European Pat. Off. | 455/102 |
| 0296790 | 12/1988 | European Pat. Off. | |

OTHER PUBLICATIONS

The Synchronous Communications Brochure.
The Cable World Technology New Article of Apr. 3, 1989.

Primary Examiner—Reinhard J. Eisenzopf
Assistant Examiner—Edward Urban
Attorney, Agent, or Firm—William A. Marvin; Frederick W. Powers, III

[57] ABSTRACT

A multiplication circuit for use in an FM television transmitter and receiver is provided. The multiplication circuit includes a limiting circuit for limiting a subcarrier supplied thereto and a dividing circuit coupled to the limiting circuit and dividing the output of the limiting circuit by a predetermined factor. A mixer is coupled to the dividing circuit and mixes the output of the dividing circuit with the subcarrier.

18 Claims, 3 Drawing Sheets

METHOD OF SUBCARRIER MULTIPLICATION WHICH PRESERVES AM INFORMATION IN FM SYSTEMS

This application is a continuation of application Ser. No. 07/382,773, filed Jul. 20, 1989.

BACKGROUND OF THE INVENTION

The present invention is generally related to frequency modulated (FM) television systems and, more particularly, to FM television systems capable of carrying television channels without removing amplitude modulated (AM) information from the audio carrier. The present invention is intended for use in FM television systems such as, but not limited to, satellite, MDS, MMDS, CATV cable supertrunk, and fiber supertrunk systems.

In the United States, terrestrial television broadcasts and most cable television (CATV) distribution is made according to National Television Systems Committee (NTSC) standards. FIG. 1 is an amplitude-vs.-frequency diagram illustrating in simplified form the RF spectrum of a typical NTSC television signal, referenced to the lower edge of a channel. NTSC standards require that picture information be separated into two components: luminance, or brightness, and chrominance, or color. The composite television signal 10 of FIG. 1 includes a luminance signal 12 and a chrominance signal 14. A composite television signal is one in which chrominance is carried on a subcarrier. (Other composite signals are SECAM, which is used in France, and PAL which predominates in the rest of Europe). The signal occupies a nominal bandwidth of 6 MHz, with the picture carrier 16 being 1.25 MHz above the lower end of the band. Chrominance information is modulated onto a color subcarrier 18 which is combined with the baseband luminance information. This composite baseband is in turn used to amplitude modulate the picture carrier 16. The color subcarrier 18 has a frequency of 3.579545 MHz, a standard established by NTSC.

In terrestrial television broadcasts and CATV distribution, audio information is frequency modulated onto another carrier 20 lying near the upper edge of the band. The audio carrier 20 has a frequency that is 4.5 MHz greater than that of the video carrier, another standard established by NTSC. The choice of 4.5 MHz for the audio subcarrier frequency represents a tradeoff of signal quality for minimum spectral bandwidth in domestic AM television systems. At this relatively low subcarrier frequency some spectral overlap occurs between video and audio information, and some degradation of the signals is tolerated due to the filters required to later separate the signals.

A television receiver receives both carriers simultaneously and extracts the original composite baseband signal. The composite baseband audio and video signals contain the necessary information to reconstruct the original picture and sound information.

Some systems transmit video and audio by frequency modulating a carrier with the processed composite video-plus-audio-subcarrier waveform. These will be referred to as FM television systems. These systems are often used in satellite television, some CATV supertrunks, studio to transmitter links and other applications requiring high quality video transmission. This process is particularly useful and effective in preserving signal quality through high noise, high loss, low signal level or high interference channels.

The tradeoff discussed above regarding the choice of frequency for the audio carrier can be alleviated in FM television systems. In FM television systems, the occupied bandwidth of the signal is not simply related to the baseband bandwidth. It is possible to use higher frequency subcarriers than 4.5 MHz, and not increase occupied bandwidth. Since FM systems are often used where minimum signal degradation is required, higher frequency subcarriers are often used. To compensate for the increased noise at higher frequencies in FM systems, the deviation of the subcarrier is also increased.

Problems can occur when attempting to carry scrambled video channels on FM television systems. Transmitted video is often scrambled or encoded to prevent viewing by unauthorized or non-paying persons. In many scrambling systems and their variations, the information required to decode or descramble the video is sent as AM on the FM audio carrier. In a similar fashion, many systems transmit terminal control or address information as AM on the audio carrier. At times, amplitude modulation of the audio carrier may be used to predistort the audio carrier in an effort to reduce interfering buzz due to the descrambling process as discussed in commonly assigned U.S. Pat. No. 4,922,532 and entitled "Synch Supression Scrambling And Descrambling Television Signals For Subscription TV" incorporated herein by the foregoing reference thereto. Other applications of AM on the audio carrier exist. In the process of multiplying the audio carrier from the normal 4.5 MHz to a higher frequency, FM television systems destroy AM information on the audio carrier, as described in the following section.

FIG. 2 is a block diagram illustrating a prior art FM video transportation system. Audio may be supplied as baseband and processed internally by baseband processor 2 and FM modulated by FM modulator 3. In this instance, there is no provision for amplitude modulated information on the audio carrier. Rather than the internally modulated audio, switch 5 can select an alternate path. In this alternate path, the audio is supplied as a previously modulated carrier. This carrier is normally frequency modulated with the audio signal, and may also be carrying amplitude modulated information as described above. This carrier is typically multiplied at multiplier circuit 4 by a predetermined rational number N/M and proceeds through the switch 5 to summation circuit 6.

The summed composite video and subcarrier(s) then frequency modulate a carrier at FM modulator 7. The output of FM modulator 7 may then be processed, frequency converted and transmitted as schematically indicated at block 8 in accordance with any of a number of prior art processes through a channel 9.

At the receive end, the signal may be frequency converted and further processed as indicated at block 10 and FM demodulated by FM demodulator 11. It is then separated by filter circuits 12 and 13 into video and subcarriers, respectively. The audio subcarrier can be demodulated by demodulator 14 into baseband. The audio subcarrier can also be multiplied by multiplier 15 with the reciprocal rational number (M/N) to the multiplier 4 in the transmitter and sent to the output as a 4.5 MHz carrier.

The above-described system is unable to pass any amplitude information on the audio carrier. If the audio is modulated internally by FM modulator 3, no provision is made for amplitude modulation. If an external audio subcarrier is brought in with amplitude modulated information, multiplier 4 acts as a limiter and removes the information. Multiplier 15 at the receive end also acts so as to remove amplitude information. Finally, limiting action in the subcarrier FM demodulator 14 will also tend to remove any AM information.

When a system such as that described above is required to pass audio carrier amplitude information, a 4.5 MHz audio carrier is typically summed with the baseband video (or, in one case, a low frequency video carrier) externally, and both are passed through the video baseband circuits 1. At the receive end, a composite video plus subcarrier output can be used that bypasses the internal separation circuits as indicated at 16. Though this technique will work, it combines the video with a 4.5 MHz subcarrier. As previously discussed, this is less than optimal. In most applications, a subsequent separation of the two is required. This separation will be imperfect and thus the scheme conflicts with the goal of low signal degradation, which may have been the original reason for using an FM system.

As discussed above, it is desirable, in an FM television system, to alter the frequency of the audio subcarrier to a frequency higher than 4.5 MHz. Ideally, the audio carrier processing circuits should possess the following properties. First, the frequency of the audio carrier should be increased at the transmitter and restored at the receiver to exactly the original 4.5 MHz. The increase in frequency is required to better separate video and audio information. Exact frequency restoration is required in order to remain within FCC intercarrier frequency tolerances.

Second, the deviation of the audio carrier should be increased at the transmitter and restored at the receiver to exactly the original deviation. The increase in deviation is required to offset the additional noise at the higher subcarrier frequency. Exact restoration to the original deviation is required for BTSC stereo.

Finally, amplitude information on the audio carrier must be preserved in order to pass scrambled video systems.

None of the known prior art accomplishes all three of these objectives simultaneously.

SUMMARY OF THE INVENTION

Accordingly, it is an object of the present invention to provide an FM television system capable of carrying television channels without removing AM information from the audio carrier, while at the same time, preserving the frequency accuracy of the audio carrier.

It is another object of the present invention to provide such an FM television system without reducing video quality.

It is another object of the present invention to provide such an FM television system without reducing audio quality.

In accordance with the present invention, a multiplication circuit for use in an FM transmitter is provided. The transmitter includes a summation circuit for summing a video carrier and at least a first subcarrier to frequency modulate a carrier. The multiplication circuit includes a limiting circuit for limiting a subcarrier supplied to an input thereof and a dividing circuit for dividing the output of the limiting circuit by a predetermined factor. A mixer is coupled to the divider circuit for mixing the output of the dividing circuit with the subcarrier. A filter is coupled to the mixer for selecting a predetermined portion of the output of the mixer to be supplied to the summation circuit of the television transmitter.

Also in accordance with the present invention, a multiplication circuit for use in an FM receiver is provided. The receiver includes a first filter for filtering a television signal to receiver a video carrier and at least a subcarrier. The multiplication circuit includes a limiting circuit for limiting a subcarrier supplied to an input thereof from the first filter. A dividing circuit is coupled to the limiting circuit and divides the output of the limiting circuit by a predetermined factor. A mixer is coupled to the dividing circuit and mixes the output of the dividing circuit with the subscriber. A second filter is coupled to the mixer and selects a predetermined portion of the output of the mixer.

Also in accordance with the present invention, a method of altering an audio subcarrier having a predetermined frequency, a predetermined deviation, and amplitude information in an FM system including a transmitter and a receiver is disclosed. First, the predetermined frequency of the audio subcarrier is increased at the transmitter. The predetermined deviation of the audio subcarrier is also increased and amplitude information on the subcarrier is preserved. At the receiver, the predetermined frequency and deviation of the audio subcarrier are restored. The amplitude information is also recovered.

BRIEF DESCRIPTION OF THE DRAWINGS

A more complete appreciation of the present invention and many of the attendant advantages thereof will be readily obtained as the invention becomes better understood through the following detailed description when read in conjunction with the accompanying drawings.

DETAILED DESCRIPTION OF A PREFERRED EMBODIMENT

Figure 3:
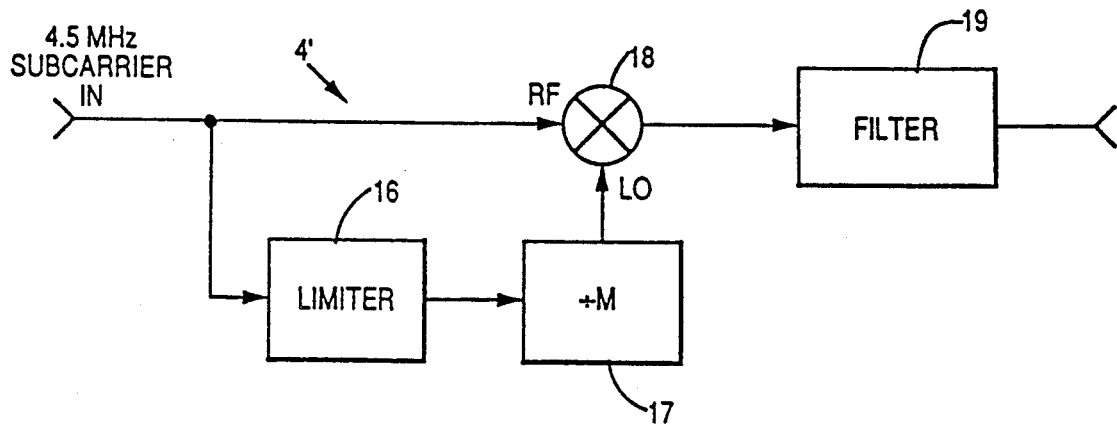
FIG. 3 is a block diagram illustrating the present invention as utilized in the transmit portion of the system of FIG. 2.
Figure 4:
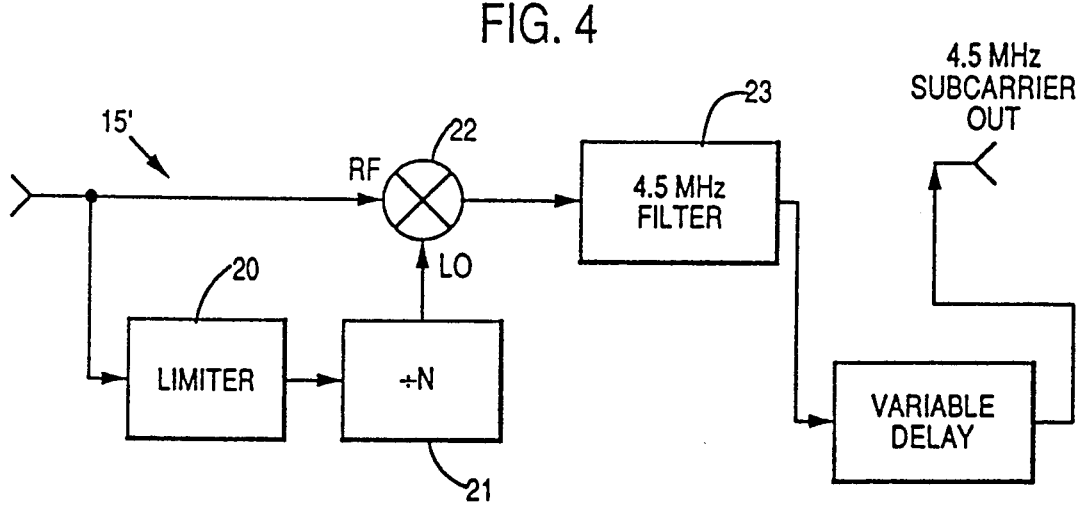
FIG. 4 is a block diagram illustrating the present invention as utilized in the receive portion of the system of FIG. 3.

FIGS. 3 and 4 represent block diagrams of the present invention.

FIG. 3 illustrates a multiplication circuit 4' utilized in the transmitter portion of an FM video communication system. The circuit of FIG. 3 may be substituted for the multiplier 4 of FIG. 2. The incoming 4.5 MHz subcarrier is split into two paths. In the first path, the subcarrier is supplied directly to the RF input of a mixer 18. The signal in the second path is limited by limiter 16. This limiting removes any AM information from the signal in this second path. The output of limiter 16 is divided by a factor M by divider circuit 17. The output of divider circuit 17 is supplied to the LO input of mixer 18. A bandpass filter 19 at the output of mixer 18 selects the appropriate mixer output signal to provide the required rational multiplication factor (N/M).

Mixer 18 passes any amplitude modulation on the subcarrier supplied to its RF input. Thus, scrambling, timing, address, control and/or amplitude predistortion information are preserved. Additionally, the deviation on the incoming subcarrier is also multiplied by the factor (N/M).

It will be apparent to those of ordinary skill that various circuits and arrangements may be utilized to provide the above-described limiting, dividing, mixing and filtering functions and the present invention is not limited to a specific arrangement of circuit components. For example, divider circuit 17 may comprise an injection locked oscillator and limiting circuit 20 may comprise an AGC loop. The filtering may be performed with any band limiting device, for example. It will be apparent that particular arrangements will depend on various factors such as intended use, design considerations, acceptable tolerance, et cetera.

Figure 2:
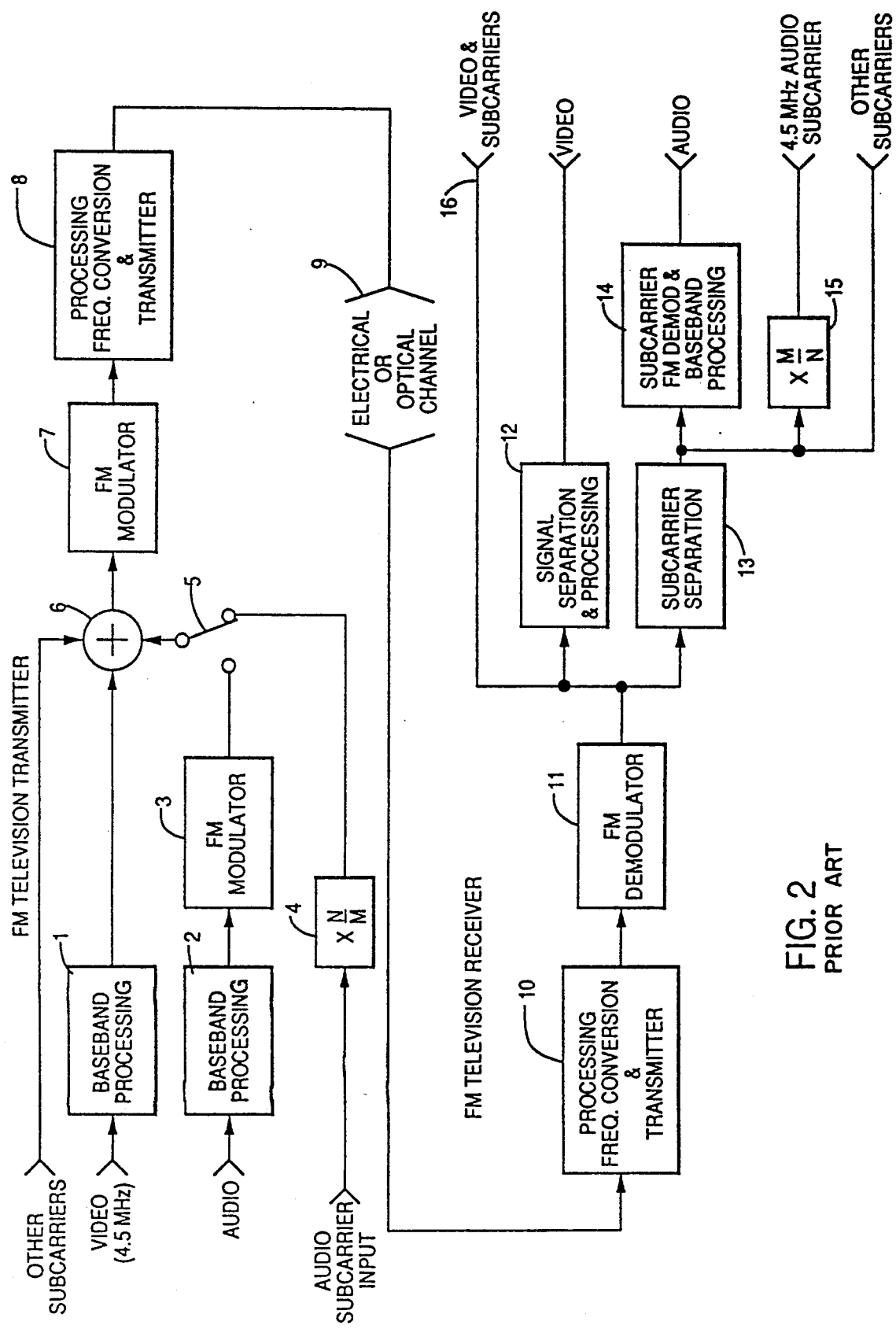
FIG. 2 is a block diagram of a prior art FM video communication system.

FIG. 4 illustrates a multiplication circuit 15' utilized in the receiver portion of an FM communication system. The circuit of FIG. 4 may be substituted for multiplier 15 of FIG. 2. The output of the subcarrier separator 13 of FIG. 2 is split into two paths. The first path leads directly to the RF input of mixer 22. The signal in the second path is limited by limiter 20. This limiting removes any AM information from the signal in this second path. The output of limiter 20 is divided by a factor N by divider circuit 21. The output of divider circuit 21 is supplied to the LO input of mixer 22. A bandpass filter 23 at the output of mixer 22 selects the appropriate mixer output signal to provide the required rational multiplication factor (M/N) which is the reciprocal of the factor utilized at the transmitter. This restores the subcarrier to its original frequency at the input of the transmitter and maintains identical AM and FM information.

Again, the mixer passes any amplitude modulation of the subcarrier at its RF input. The deviation of the subcarrier is also multiplied by the factor (M/N), and is thus restored to its original value at the input of the transmitter.

Thus, each of the three requirements described above are met by the present invention.

A variable delay circuit 24 is added at the output of the bandpass filter. This delay, along with a deliberate timing advance in the video scrambler, provides a means for compensating any timing errors introduced by the different signal paths of the audio and video carriers.

Figure 1:
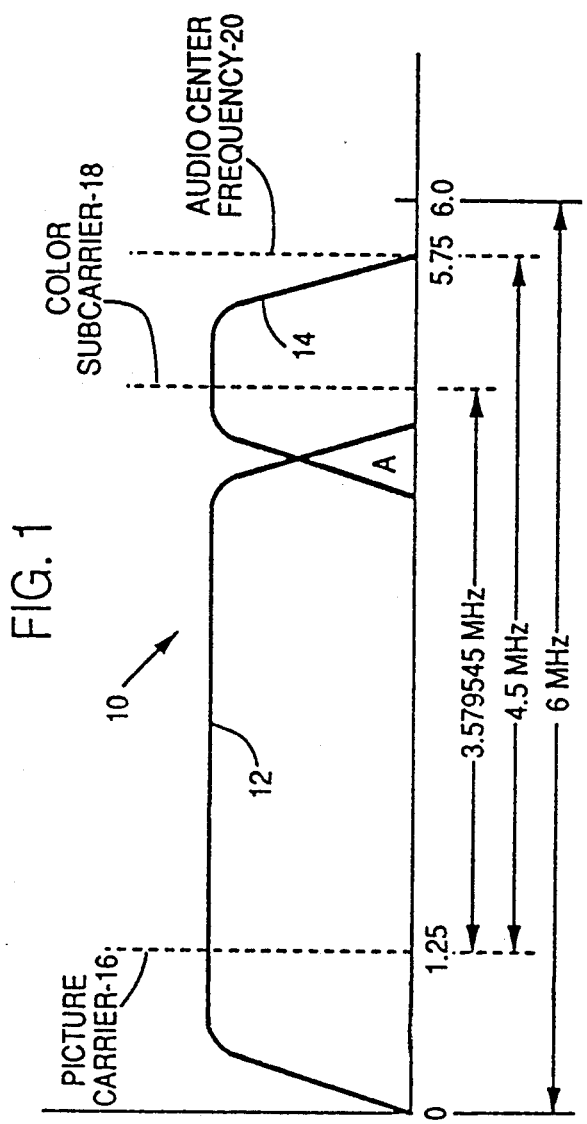
FIG. 1 is an amplitude-vs.-frequency diagram illustrating in simplified form a typical NTSC television signal.
Figure 5:
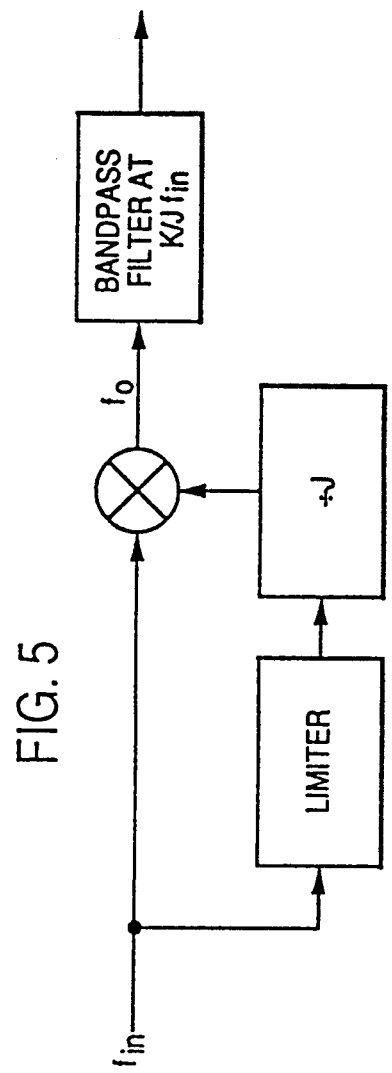
FIG. 5 is a general block diagram of the present invention.

FIG. 5 is a general block diagram illustrating either the receive or transmit half of the present invention. The input frequency is fin and the output frequency is fo. In general, if a multiplication factor of K/J is desired, the following equation can be written:

$$fo = a \times fin + b \times (fin/J)$$

where b is a positive or negative integer. a is restricted to +1 or −1 since fin is supplied to the linear input of the mixer. Now, $$fo = (K/J) \times fin = a \times fin + b \times (fin/J) = (a + b/J)fin$$

Therefore
K/J = a + b/J
K = J(a + b/J)
K = (J×a) + b

For example, if it is desired to multiply 4.5 MHz by 3/2 to get 6.75 MHz,

K = 3, J = 2 then

K = 2a + b = 3,

The values a = 1, b = 1 will satisfy this requirement.

More than one combination of a and b values may work, but the lowest absolute value of b usually provides the best performance. In general, the output bandpass filter is used to select the desired mixing product. A filter may also be required at the output of the divider to improve the duty cycle after division.

The invention has been described in detail in connection with the preferred embodiments. These embodiments, however, are merely for example only and the invention is not limited thereto. It will be appreciated by those skilled in the art that other variations and modifications can easily be made within the scope of this invention as defined by the appended claims.

We claim:

1. A circuit for processing a signal including a carrier which has been amplitude and frequency modulated to alter carrier frequency and frequency deviation of the signal by a selected factor while preserving the amplitude modulation of the signal, said circuit comprising:

means for removing the amplitude modulation from the signal to generate a second signal which includes the carrier frequency and the frequency modulation;

means for mixing the signal with said second signal to generate at an output of said mixing means a plurality of mixing products which include at least sum and difference products of the signal and said second signal; and means for filtering said output of said mixing means to select the mixing product which includes the carrier frequency and frequency deviation altered by the selected factor along with the amplitude modulation.

2. The circuit according to claim 1 wherein said carrier is an audio subcarrier for use in a FM television system.

3. The circuit according to claim 2 wherein said FM television system is a supertrunk system.

4. The circuit according to claim 2 wherein said amplitude modulation on said audio subcarrier is television descrambling information.

5. The circuit according to claim 1 wherein the selected factor is equal to the ratio N/M, where N and M are integers, said circuit further comprising dividing means coupled between said removing means and said mixing means, for dividing the carrier frequency and the frequency deviation of said second signal by said integer M, and the integer N is chosen by selecting the appropriate mixing product.

6. The circuit according to claim 5 wherein said selected factor N/M is greater than 1 and said circuit comprises a portion of an FM transmitter.

7. The circuit according to claim 5 wherein said selected factor N/M is less than 1 and said circuit comprises a portion of an FM television receiver.

8. The circuit according to claim 5 wherein said signal comprises an audio subcarrier at a frequency of 5.75 megahertz.

9. A method of processing a signal including a carrier which has been amplitude and frequency modulated to alter carrier frequency and frequency deviation of the signal by a selected factor, while preserving the amplitude modulation of the signal, said method comprising the steps of:

removing the amplitude modulation from the signal to generate a second signal which includes the carrier frequency and the frequency modulation;

mixing the signal with the second signal to generate a plurality of mixing products which include at least sum and difference products of the signal and the second signal; and filtering the plurality of mixing products to select the mixing product which includes the carrier frequency and frequency deviation altered by the selected factor along with the amplitude modulation.

10. The method according to claim 9 and comprising the step of dividing the carrier frequency and frequency deviation of said second signal by the integer M prior to said step of mixing.

11. The method according to claim 9 wherein the selected factor (N/M) is a greater than 1.

12. The method according to claim 9 wherein the selected factor (N/M) is less than 1.

13. The method of claim 9 wherein said amplitude modulation on said signal is television descrambling information.

14. Circuitry for processing a first signal including a carrier which has been amplitude and frequency modulated to alter carrier frequency and frequency deviation of the first signal at a transmitter side and at a receiver side of an FM television system to prevent spectral overlap of signals, while preserving the amplitude modulation of the first signal, said circuitry comprising:

a) a first circuit, comprising a portion of an FM television transmitter, for increasing the frequency and frequency deviation of the first signal by a first selected factor (N/M), where N and M are integers, while preserving the amplitude modulation, said first circuit comprising:

i) first removing means for removing the amplitude modulation from the first signal to generate a second signal which includes the carrier frequency and the frequency modulation of the first signal;

ii) first mixing means for mixing the first signal with said second signal to generate at an output of said first mixing means a plurality of mixing products which include at least sum and difference products of the first and the second signals; and iii) first filtering means for filtering said output of said first mixing means to select the mixing product as a third signal which includes a carrier frequency and a frequency deviation altered by the first selected factor (N/M) along with the amplitude modulation; and b) a second circuit, comprising a portion of a FM television receiver, for decreasing the frequency and frequency deviation of the third signal by a second selected factor (M/N), where the second selected factor (M/N) is a reciprocal of the first selected factor (N/M), while preserving the amplitude modulation, said second circuit comprising:

i) second means for removing the amplitude modulation from said third signal to generate a fourth signal which includes the carrier frequency and the frequency deviation of said third signal.

ii) second means for mixing the third signal with the fourth signal to generate at an output of said second mixing means a plurality of mixing products which include at least the sum and difference products of the third and the fourth signals; and iii) second means for filtering said output of said second mixing means to select the mixing product as a fifth signal which includes a carrier frequency and a frequency deviation altered by said second selected factor (M/N) and containing the amplitude modulation, wherein the carrier frequency, frequency deviation, frequency and amplitude modulation of the fifth signal are equal to the carrier frequency, frequency deviation, frequency and amplitude modulation, respectively, of the first signal.

15. The circuit according to claim 14 wherein said first circuit further comprises dividing means, coupled between said first removing means and said first mixing means for dividing the carrier frequency and frequency deviation of said second signal by said integer M.

16. The circuit according to claim 14 wherein said second circuit further comprises dividing means, coupled between said second removing means and said second mixing means, for dividing the carrier frequency and frequency deviation of said fourth signal by said integer N.

17. A circuit for processing an input signal including a carrier which has been amplitude and frequency modulated to alter carrier frequency and frequency deviation of the input signal by a selected factor (N/M), where N and M are integers, while preserving the amplitude modulation of the input signal, said circuit comprising:

removing means for removing the amplitude modulation from the input signal to generate a second signal which includes the carrier frequency and the frequency modulation;

dividing means coupled to said removing means for dividing the carrier frequency and frequency deviation of the second signal by the integer M;

mixing means for mixing the input signal with an output of said dividing means to generate a plurality of mixing products which include at least sum and difference products of the input signal and the output of the dividing means; and selecting means coupled to said mixing means for selecting a mixing product which includes the carrier frequency and frequency deviation altered by the selected factor (N/M) along with the amplitude modulation, where the integer N of the selected factor (N/M) is chosen by selecting the appropriate mixing product.

18. The circuit according to claim 17, wherein said selecting means comprises a filter.

* * * * *